US012366786B2

(12) United States Patent
Sun et al.

(10) Patent No.: US 12,366,786 B2
(45) Date of Patent: Jul. 22, 2025

(54) REFLECTIVE DISPLAY DEVICE, DISPLAY PANEL, AND DISPLAY

(71) Applicant: Huawei Technologies Co., Ltd., Shenzhen (CN)

(72) Inventors: Shang Sun, Shenzhen (CN); Youming Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/309,315

(22) Filed: Apr. 28, 2023

(65) Prior Publication Data

US 2023/0384645 A1 Nov. 30, 2023

Related U.S. Application Data

(63) Continuation of application No. PCT/CN2020/125668, filed on Oct. 31, 2020.

(51) Int. Cl.
*G02F 1/163* (2006.01)
*G09G 3/38* (2006.01)

(52) U.S. Cl.
CPC ............... *G02F 1/163* (2013.01); *G09G 3/38* (2013.01); *G09G 2320/02* (2013.01); *G09G 2330/023* (2013.01)

(58) Field of Classification Search
CPC ...... G02F 1/157; G02F 1/163; G02F 2202/30; G09G 3/38; G09G 2300/0452; G09G 2330/023; G09G 2320/02
See application file for complete search history.

(56) References Cited

U.S. PATENT DOCUMENTS

| | | | | |
|---|---|---|---|---|
| 7,009,750 | B1 | 3/2006 | Westfall et al. | |
| 9,046,731 | B2 | 6/2015 | Lezec et al. | |
| 2009/0224245 | A1* | 9/2009 | Umezaki | H01L 27/12 257/59 |
| 2009/0284696 | A1 | 11/2009 | Cheong et al. | |
| 2010/0091224 | A1 | 4/2010 | Cho et al. | |
| 2011/0115367 | A1* | 5/2011 | Cho | H10K 50/85 313/504 |

(Continued)

FOREIGN PATENT DOCUMENTS

| | | | |
|---|---|---|---|
| CN | 106291800 | A | 1/2017 |
| CN | 109581565 | A | 4/2019 |

(Continued)

OTHER PUBLICATIONS

Xu, Ting, et al. "High-contrast and fast electrochromic switching enabled by plasmonics." Nature Communications 7.1 2016, 6 pages.

*Primary Examiner* — Shaheda A Abdin
(74) *Attorney, Agent, or Firm* — Conley Rose, P.C.

(57) ABSTRACT

A reflective display device includes an antenna array that includes a dielectric material array with an electrochromic material thin film is disposed on one side of a substrate; a control circuit is connected to the electrochromic material thin film using a conductive material so as to control an electrochromic material using an electrical signal; and a change of an imaginary part of a refractive index of the electrochromic material thin film is controlled using the electrical signal to change a specific color of a display luminance.

20 Claims, 8 Drawing Sheets

(56) References Cited

U.S. PATENT DOCUMENTS

| | | | | |
|---|---|---|---|---|
| 2011/0164303 | A1* | 7/2011 | Hampp | G02F 1/153 359/275 |
| 2011/0170042 | A1 | 7/2011 | Cho et al. | |
| 2012/0113496 | A1* | 5/2012 | Ueda | G02F 1/153 359/266 |
| 2014/0106684 | A1* | 4/2014 | Burns | H01Q 21/28 29/601 |
| 2015/0255856 | A1* | 9/2015 | Hong | H01Q 21/061 343/702 |
| 2015/0316694 | A1 | 11/2015 | Wu et al. | |
| 2019/0384133 | A1* | 12/2019 | Li | G02F 1/155 |
| 2021/0165270 | A1 | 6/2021 | Meng et al. | |
| 2021/0232002 | A1 | 7/2021 | Yang et al. | |

FOREIGN PATENT DOCUMENTS

| | | | |
|---|---|---|---|
| EP | 0084603 | A1 | 10/1982 |
| JP | 2009276766 | A | 11/2009 |
| JP | 2011145672 | A | 7/2011 |
| JP | 2013148727 | A | 8/2013 |
| WO | 9606203 | A1 | 2/1996 |
| WO | 2018176761 | A1 | 10/2018 |

* cited by examiner

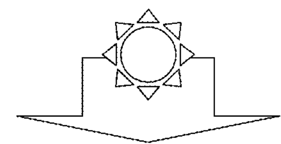
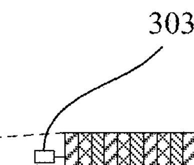
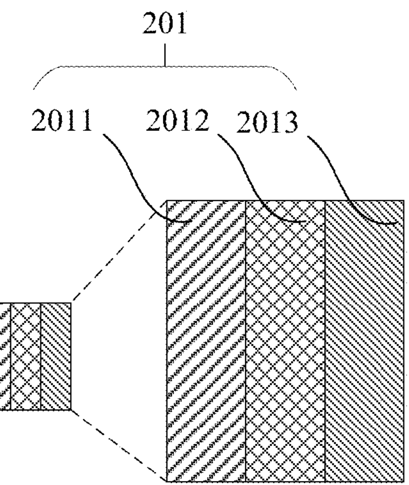
FIG. 2A FIG. 2B FIG. 2C FIG. 2D
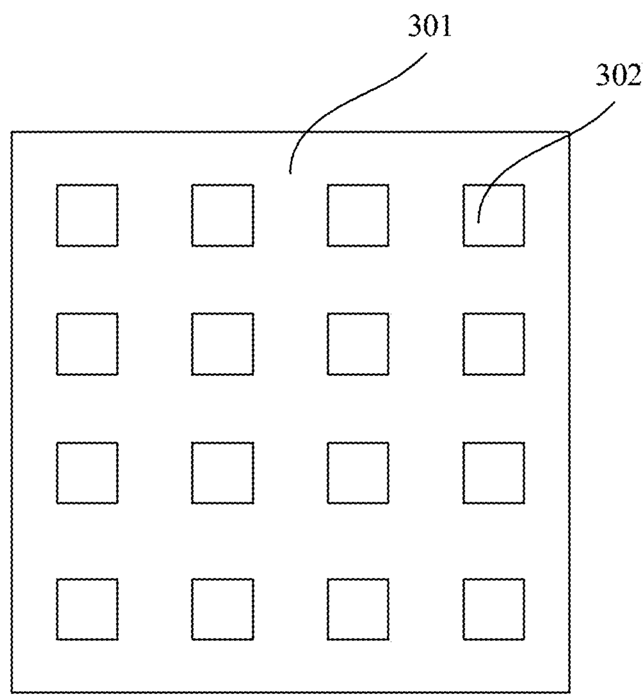
FIG. 3

REFLECTIVE DISPLAY DEVICE, DISPLAY PANEL, AND DISPLAY

CROSS-REFERENCE TO RELATED APPLICATIONS

This is a continuation application of International Patent Application No. PCT/CN2020/125668 filed on Oct. 31, 2020, which is hereby incorporated by reference in its entirety.

TECHNICAL FIELD

This disclosure relates to the field of displaying technologies, and in particular, to a reflective display device, a display panel, and a display.

BACKGROUND

A self-luminous transmissive displaying technology, such as liquid crystal displaying or organic electroluminescent displaying, is usually applied to a display device used in an electronic device. Brightness displayed when the self-luminous transmissive displaying technology is used greatly differs from ambient light, and consequently, is prone to irritate human eyes, leading to dry eyes and eye fatigue. A reflective displaying technology that uses ambient light and that has eye-protective effect is developed, to resolve the problem existing in the self-luminous transmissive displaying technology.

The existing reflective displaying technology mainly includes emissive reflective liquid crystal displaying, electrophoretic displaying, electrowetting displaying, and micro-electromechanical system (MEMS) displaying, and the like. The reflective liquid crystal displaying technology has disadvantages of low reflectance, a large thickness, and high energy consumption; the electrophoretic displaying technology has disadvantages of low resolution, complex processing, low reflectance, and a low refresh rate; the electrowetting displaying technology has disadvantages of a complex design process, a high drive voltage, low resolution, and complex processing; and the micro-electromechanical system displaying technology has disadvantages of a low processing yield rate, high costs, and poor stability.

SUMMARY

Embodiments of this disclosure provide a reflective display device, a display panel, and a display, to resolve problems of low resolution, low reflectance, high energy consumption, and complex processing of an existing reflective display device, and therefore to improve resolution and reflectance of the reflective display device, and reduce product energy consumption and costs.

To achieve the foregoing objective, this disclosure uses the following technical solutions.

According to a first aspect, this disclosure provides a reflective display device. The reflective display device includes a substrate, an antenna array, and a control circuit. The antenna array is disposed on one side of the substrate. The antenna array includes a dielectric material array periodically arranged and an electrochromic material thin film covering a surface of the dielectric material array, and the dielectric material array is configured to reflect visible light to form a reflection peak. A dielectric material is a material that can be highly electrically polarized. In the dielectric material array, a dielectric material is made into a fixed shape and arranged according to a specific rule, for example, arranged in a square array or a hexagon array. An electrochromic material refers to a material in which that a stable and reversible color change occurs on optical attributes, such as reflectance, transmittance, and an absorption rate, of the material under an action of an applied electric field, and is presented as a reversible color and transparency change in appearance. For example, in the reflective display device in this embodiment of this disclosure, when a voltage is applied to the electrochromic material thin film, an imaginary part of a refractive index of the electrochromic material thin film may change. In this way, a light absorption rate of the electrochromic material changes, that is, a height of a reflection peak of a formed reflection spectrum changes, and finally a color change and a luminance change are reflected. The control circuit is connected to the electrochromic material thin film by using a conductive material, and is configured to adjust the imaginary part of the refractive index of the electrochromic material thin film, to adjust the reflection peak formed by the dielectric material array for the visible light.

In the reflective display device provided in the first aspect, the antenna array formed by the dielectric material array and the electrochromic material thin film is disposed on one side of the substrate, the control circuit is connected to the electrochromic material thin film by using the conductive material, to control the electrochromic material by using an electrical signal, and a change of the imaginary part of the refractive index of the electrochromic material thin film is controlled by using the electrical signal. In this case, display luminance of a specific color is changed. In this way, different colors and luminance can be displayed by using antenna arrays of different geometric sizes, and various colors may be displayed based on a combination of different colors and luminance. In the reflective display device provided in the first aspect, a nanometer-level antenna array can support an optical resonance mode, and form a reflection peak with high reflectance and a narrow bandwidth, to improve resolution and reflectance of the display device. The antenna array is made of the dielectric material, and can be produced by using a semiconductor manufacturing method. This can reduce production costs. An imaginary part of a refractive index of the electrochromic material can be continuously controlled by using the electrical signal, to continuously change luminance of a specific color, and display different colors and luminance based on an additive color principle. In addition, the electrochromic material further has a bistable characteristic, and a state obtained when an optical loss of the electrochromic material changes can be continuously maintained, and the electrical signal does not need to be continuously applied. Therefore, when luminance is adjusted, the electrochromic material does not need to continuously consume energy. This can reduce energy consumption of the entire display device. A thickness of the electrochromic material thin film is a nanometer-level thickness. During optical modulation, a smaller thickness of the electrochromic material thin film indicates better effect of adjusting the imaginary part of the refractive index of the electrochromic material thin film, and a faster response speed. In addition, a strong local electromagnetic field is generated around the dielectric material array due to resonance effect, to further improve adjustment effect and a response speed of the imaginary part of the refractive index of the electrochromic material.

In a possible implementation, a first conductive layer is disposed between the dielectric material array and the electrochromic material thin film, a second conductive layer is disposed on a side that is of the electrochromic material thin film and that is away from the dielectric material array, and both the first conductive layer and the second conductive layer are connected to the control circuit. In this possible implementation, to enable the electrochromic material thin film to adjust the imaginary part of the refractive index of the electrochromic material under control of the electrical signal, and to adjust luminance of a specific color, a conductive layer needs to be separately disposed on an upper side and a lower side of the electrochromic material thin film, to transmit the electrical signal. In this way, the antenna array is further displayed in various colors.

Further, a refractive index of a material of the dielectric material array is greater than a refractive index of a material of the substrate. In this further solution, a large refractive index contrast enables the antenna array to generate a sufficiently strong light field localization mode, to support the reflection peak with high reflectance and a narrow bandwidth.

Optionally, a real part of the refractive index of the material of the dielectric material array is greater than 2.

Optionally, a real part of the refractive index of the material of the substrate is less than 2.

Optionally, the side that is of the substrate and on which the antenna array is disposed is made of a transparent material. This facilitates reflection of ambient light.

Optionally, the material of the dielectric material array may include one or more of the following such as silicon, silicon nitride, gallium nitride, and titanium dioxide.

According to a second aspect, this disclosure provides a display panel. The display panel includes a plurality of pixel units. The plurality of pixel units is periodically arranged, and each pixel unit includes a plurality of reflective display devices. The reflective display device is any possible reflective display device according to the first aspect. In this way, the plurality of reflective display devices may separately display different colors, and together form a pixel unit as a color pixel unit. Color pixel units may be periodically arranged to form a color display panel. Through independent control of control circuits in different reflective display devices in each pixel unit, luminance of each pixel unit is adjusted, to display a color image.

In a possible implementation, each pixel unit includes at least three reflective display devices. In different reflective display devices, antenna widths in an antenna array are different, and array periods of the antenna array are different. In this way, different antenna widths and different array periods of the antenna array may be displayed in different colors, to display a color image.

According to a third aspect, this disclosure provides a display. The display includes a display driver and any possible display panel according to the second aspect. The display driver is connected to the display panel, and is configured to control the display panel to display an image.

According to a fourth aspect, this disclosure provides an electronic device. The electronic device includes a drive circuit and the display provided in the third aspect.

According to a fifth aspect, this disclosure provides an image display control method. The image display control method is applied to a display. The display includes a display driver and a display panel. The display driver is connected to the display panel, and is configured to control the display panel to display an image. The display panel includes a plurality of pixel units. The plurality of pixel units is periodically arranged, and each pixel unit includes a plurality of reflective display devices. The reflective display device includes: a substrate; an antenna array, disposed on one side of the substrate, where the antenna array includes a dielectric material array periodically arranged and an electrochromic material thin film covering a surface of the dielectric material array, and the dielectric material array is configured to reflect visible light to form a reflection peak; and a control circuit, connected to the electrochromic material thin film by using a conductive material, and configured to adjust an imaginary part of a refractive index of the electrochromic material thin film, to adjust the reflection peak formed by the dielectric material array for the visible light.

The image display control method includes: The display driver receives an image display signal; the display driver sends a display control signal to a control circuit of each reflective display device in each pixel unit based on the image display signal; the control circuit adjusts the imaginary part of the refractive index of the electrochromic material thin film in each reflective display device based on the display control signal, to adjust luminance of each reflective display device; and the display panel displays an image corresponding to the image display signal.

In a possible implementation, that the control circuit adjusts the imaginary part of the refractive index of the electrochromic material thin film in each reflective display device based on the display control signal includes: The control circuit outputs a control voltage. The control voltage is determined based on the display control signal, and the control voltage is used for adjusting the imaginary part of the refractive index of the electrochromic material thin film in each display device.

It may be understood that the display panel, the display, the electronic device, the image display control method, and the like provided above may be implemented by the reflective display device provided above or associated with the reflective display device provided above. Therefore, for advantageous effect that can be achieved, refer to advantageous effect of the reflective display device provided above, and details are not described herein again.

BRIEF DESCRIPTION OF DRAWINGS

FIGS. 2A-2D are a schematic diagram of a structure of a display principle of a display panel according to an embodiment of this disclosure;

FIG. 3 is a top view of a reflective display device according to an embodiment of this disclosure;

Figure 1:
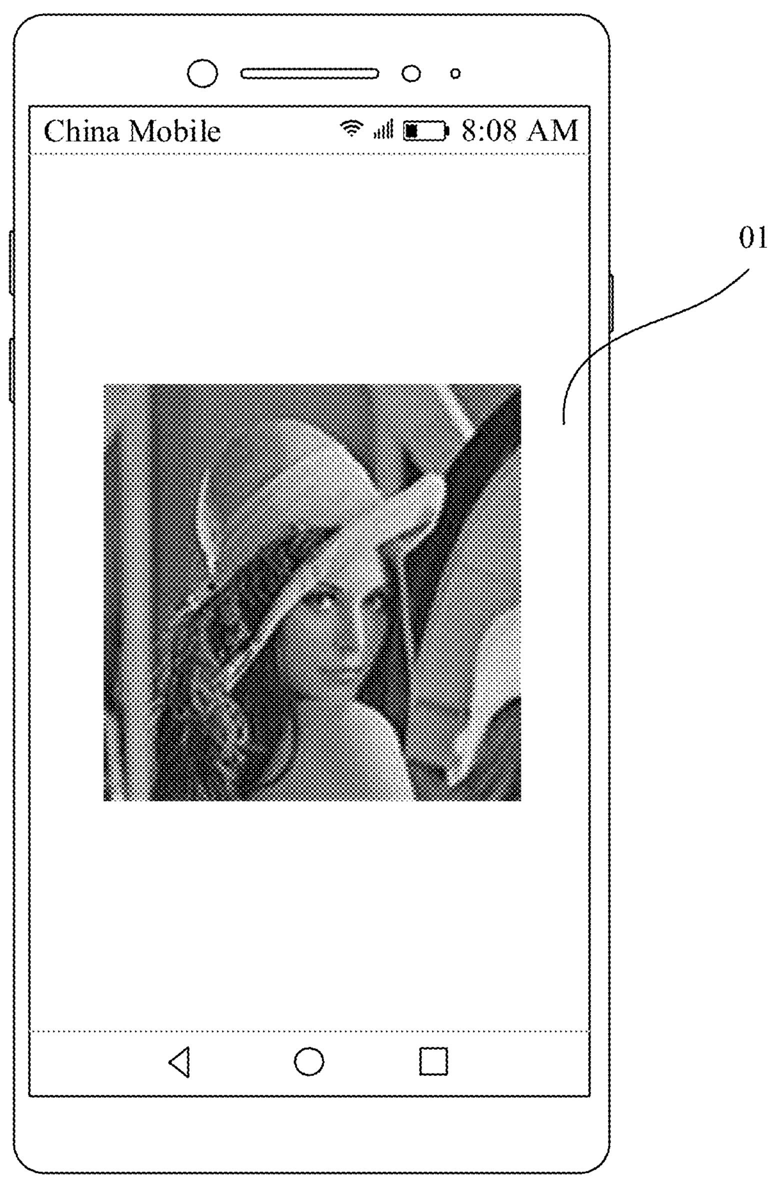
FIG. 1 is a schematic diagram of a structure of an electronic device according to an embodiment of this disclosure.

Reference numerals: 01: display; 201: pixel unit; 2011: first single-pixel unit; 2012: second single-pixel unit; 2013: third single-pixel unit; 301: substrate; 302: antenna array; 3021: dielectric material array; 3022: electrochromic material thin film; 303: control circuit; 304: first conductive layer; 305: second conductive layer; and 306: electrolyte layer.

DESCRIPTION OF EMBODIMENTS

The following explains and describes terms used in embodiments of this disclosure.

(1) Dielectric Material

The dielectric material in this disclosure is a dielectric. The dielectric is an insulator that can be Electrically Polarized, and is Usually a Substance that can be Highly Electrically Polarized, for example, silicon, silicon nitride, gallium nitride, and titanium dioxide.

(2) Electrochromic Material

The electrochromic material in this disclosure refers to a material that a stable and reversible color change occurs on optical attributes, such as reflectance, transmittance, and an absorption rate, of a material under an action of an applied electric field, and is presented as a reversible color and transparency change in appearance.

(3) Structural Color

The structural color in this disclosure is a color generated by scattering, wave interference, or diffraction of light when the light is incident to an object whose spatial period is close to a wavelength.

(4) Additive Color Process

The additive color process in this disclosure is a method of mixing specific colors in different proportions to form a new color. The specific colors may be three primary colors: red, green, and blue, or may be another color.

The following describes technical solutions in embodiments of this disclosure with reference to the accompanying drawings in embodiments of this disclosure. It is clear that the described embodiments are merely a part rather than all of embodiments of this disclosure.

Terms such as "first" and "second" mentioned below are merely intended for a purpose of description, and shall not be understood as an indication or implication of relative importance or implicit indication of a quantity of indicated technical features. Therefore, a feature limited by "first", "second" and the like may explicitly indicate or implicitly include one or more such features.

In addition, in this disclosure, terms of direction such as "upper", "lower", "left", "right", "horizontal", and "vertical" are defined relative to an illustrated placement position of a component in an accompanying drawing. It should be understood that these directional terms are relative concepts and are used to describe and clarify relativity, and may be changed accordingly as a placement position of the component in the accompanying drawing changes.

An embodiment of this disclosure provides an electronic device (as shown in FIG. 1). The electronic device may be a mobile phone, a tablet computer, an intelligent wearable device, a goods tag, a personal digital assistant (PDA), a vehicle-mounted computer, an electronic book, or the like. A form of the electronic device is not limited in this embodiment of this disclosure.

The electronic device includes a drive circuit (not shown in FIG. 1) and a display 01. The drive circuit is configured to control the electronic device to perform a corresponding function. The display 01 includes a display driver and a display panel shown in FIGS. 2A-2D. The display driver is connected to the display panel shown in FIGS. 2A-2D, and may be configured to control the display panel to display an image.

An embodiment of this disclosure further provides a display panel (as shown in FIGS. 2A-2D). The display panel includes a plurality of pixel units 201 shown in FIG. 2C, and the plurality of pixel units 201 are used as one color pixel unit and are periodically arranged. The periodic arrangement may be that the pixel units are sequentially and repeatedly arranged in a horizontal direction and a vertical direction of the display panel, and on the entire display panel, as shown in FIG. 2B. In this way, the display panel may be controlled to display an image shown in FIG. 2A.

Referring to FIGS. 2C and 2D, each pixel unit 201 includes a combination of a plurality of colors, for example, a combination of three colors: red, green, and blue, that is, each pixel unit 201 includes a plurality of single-pixel units. Based on an additive color principle of the color, various colors can be displayed by a combination of a plurality of colors at different levels of luminance. For example, each pixel unit 201 includes a combination of three colors. Each pixel unit 201 includes three single-pixel units: a first single-pixel unit 2011, a second single-pixel unit 2012, and a third single-pixel unit 2013, as shown in FIG. 2D.

To display different colors, some embodiments of this disclosure provide a reflective display device. A plurality of reflective display devices may be disposed in each pixel unit 201 in the display panel shown in FIG. 1, and each reflective display device displays one color. In an example, in this embodiment of this disclosure, the first single-pixel unit 2011, the second single-pixel unit 2012, and the third single-pixel unit 2013 may all use the reflective display device provided in this embodiment of this disclosure. For example, each pixel unit 201 displays three different colors. Generally, red, green, and blue are selected as a color combination. To enable each pixel unit 201 to display three different colors, each pixel unit 201 includes three reflective display devices. That is, the first single-pixel unit 2011 corresponds to a first reflective display device and is configured to display a color, for example, red; the second single-pixel unit 2012 corresponds to a second reflective display device and is configured to display another color, for example, green; and the third single-pixel unit 2013 corresponds to a third reflective display device and is configured to display still another color, for example, blue.

To enable the first reflective display device, the second reflective display device, and the third reflective display device corresponding to the color pixel units display different colors, for example, to separately display red, green, and blue, an antenna array of different antenna widths and array periods may be disposed between the first reflective display device, the second reflective display device, and the third reflective display device. The antenna array may be a structural component for color displaying in the reflective display device.

Figure 4:
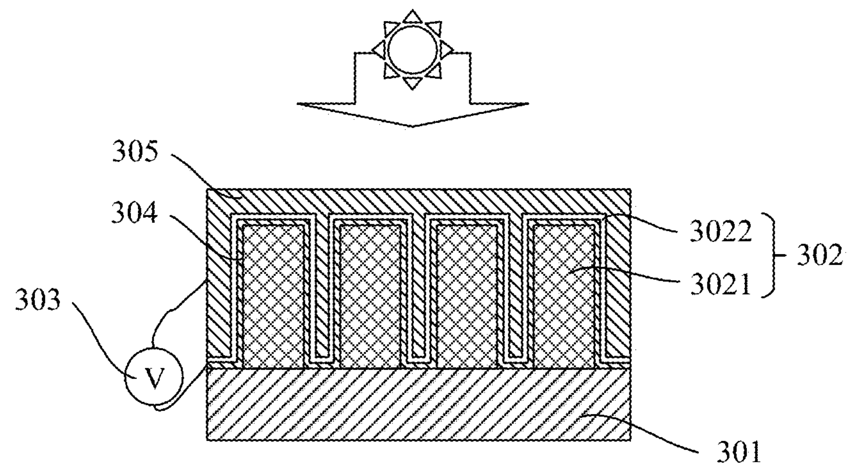
FIG. 4 is a schematic diagram of a structure of a reflective display device according to an embodiment of this disclosure.

FIG. 3 is a top view of a reflective display device according to an embodiment of this disclosure. FIG. 4 is a schematic diagram of a structure of a reflective display device according to an embodiment of this disclosure. Referring to FIG. 3 and FIG. 4, a reflective display device includes a substrate 301, an antenna array 302, and a control circuit 303.

The substrate 301 is made of a transparent material, or at least one side that is of the substrate 301 and that is close to the antenna array 302 is made of a transparent material, to improve reflection efficiency of ambient light. It should be understood that an imaginary part of a refractive index of the material used by the substrate 301 is low, to avoid a loss caused to an optical mode in the array. The substrate 301 plays a support role in the reflective display device. For example, the substrate 301 may be made of a glass material.

The antenna array 302 is disposed on one side of the substrate 301. The antenna array 302 includes a dielectric material array 3021 periodically arranged and an electrochromic material thin film 3022 covering a surface of the dielectric material array 3021, and the dielectric material array 3021 is configured to reflect visible light to form a reflection peak.

It should be noted that the dielectric material array 3021 is nanometer-level, and the dielectric material array 3021 may be regularly arranged by using nanometer dielectric material structures of different shapes and sizes, for example, a square array or a hexagon array. The dielectric material array 3021 may also be arranged based on a specific display requirement and according to any rule. In the antenna array 302, each antenna, that is, the nanometer dielectric material, may be of a three-dimensional structure in a cube shape, a cylinder shape, or another shape.

For a dielectric material in the dielectric material array 3021, various optical dielectric materials may be selected, and the optical dielectric material has characteristics of a high refractive index and a low loss. A low loss means that the imaginary part of the refractive index is low. Optionally, a refractive index of a material of the dielectric material array 3021 is greater than the refractive index of the material of the substrate 301. In this way, a large refractive index contrast enables the antenna array 302 to generate a sufficiently strong light field localization mode, to support the reflection peak with high reflectance and a narrow bandwidth. For example, a real part of the refractive index of the material of the dielectric material array 3021 is greater than 2, and a real part of the refractive index of the material of the substrate 301 is less than 2. The material of the dielectric material array 3021 may be, for example, silicon, silicon nitride, gallium nitride, and titanium dioxide. It should be understood that a composite dielectric material including a plurality of dielectric materials may alternatively be selected as the material of the dielectric material array 3021, for example, a composite dielectric material including silicon nitride and titanium dioxide.

The dielectric material array 3021 may support an electric dipole resonance mode and a magnetic dipole resonance mode in a visible light band, and may form reflection of a limited bandwidth at a specific spectral wavelength position, that is, form the reflection peak with high reflectance and a narrow bandwidth. A reflection position of the limited bandwidth, that is, the spectral wavelength position, may change by adjusting geometric parameters of the dielectric material array 3021, for example, a period, a horizontal width, a height, and an arrangement manner of the dielectric material array 3021. Different spectral wavelength positions may correspond to different types of color display, that is, correspond to different structural colors.

It should be understood that the period of the dielectric material array 3021 is a distance between two adjacent dielectric material structures, for example, a distance from a leftmost endpoint of an $i^{th}$ dielectric material structure to a leftmost endpoint of an $(i+1)^{th}$ dielectric material structure. The horizontal width of the dielectric material array 3021 is a distance from the leftmost endpoint to a rightmost endpoint in the $i^{th}$ dielectric material structure.

In this disclosure, a horizontal width of a single dielectric material structure in the dielectric material array 3021 is at a hundred nanometer level, to effectively improve resolution of the reflective display device.

In addition, the electrochromic material thin film 3022 is disposed on the surface of the dielectric material array 3021, and forms the antenna array 302 together with the dielectric material array 3021. In the reflective display device provided in this embodiment of this disclosure, the nanometer-level antenna array 302 can support an optical resonance mode, and form the reflection peak with high reflectance and a narrow bandwidth. In the optical resonance mode, strong light field enhancement is formed in a localization range of the surface of the dielectric material array 3021, and interaction between the electrochromic material thin film 3022 covering the surface and the light field can be efficiently enhanced. Therefore, light modulation can be implemented by using only an extremely thin electrochromic material. A thickness of the electrochromic material thin film 3022 may be less than 50 nm. This helps improve a modulation rate of the electrochromic material and improve display performance. That is, the thickness of the electrochromic material thin film 3022 is a nanometer-level thickness. During optical modulation, a smaller thickness of the electrochromic material thin film 3022 indicates better effect of adjusting the imaginary part of the refractive index of the electrochromic material thin film 3022, and a faster response speed. In addition, a strong local electromagnetic field is generated around the dielectric material array 3021 due to resonance effect, to further improve adjustment effect and a response speed of the imaginary part of the refractive index of the electrochromic material.

Because an optical absorption rate of the electrochromic material can change under an action of an applied electric field, the electrochromic material may change the imaginary part of the refractive index of the electrochromic material under control of an electrical signal. A change of the imaginary part of the refractive index may be actually understood as a change of the optical absorption rate of the electrochromic material. In an example, when the imaginary part of the refractive index of the electrochromic material changes, the electrochromic material may continuously change between no optical loss, a low optical loss, and a high optical loss.

It should be further noted that, when the imaginary part of the refractive index of the electrochromic material thin film 3022 increases, the film is presented as a material with an optical loss. Therefore, a resonance mode supported by the antenna array 302 is attenuated, coupling with incident light is weakened, and reflectance of the antenna array 302 is reduced, that is, luminance of a structural color is reduced.

To control a change of the imaginary part of the refractive index of the electrochromic material thin film 3022, the corresponding electrical signal may be applied to the electrochromic material thin film 3022 for control. The electrical signal may be output by the control circuit 303, and the control circuit 303 is connected to the electrochromic material thin film 3022 by using a conductive material, to adjust the imaginary part of the refractive index of the electrochromic material thin film 3022, and adjust the reflection peak formed by the dielectric material array 3021 for the visible light. For example, a first conductive layer 304 is disposed between the dielectric material array 3021 and the electrochromic material thin film 3022, and a second conductive layer 305 is disposed on a side that is of the electrochromic material thin film 3022 and that is away from the dielectric material array 3021. The control circuit 303 may connect the electrochromic material thin film 3022 by using the first conductive layer 304 and the second conductive layer 305, to adjust the imaginary part of the refractive index of the electrochromic material thin film 3022.

Figure 5:
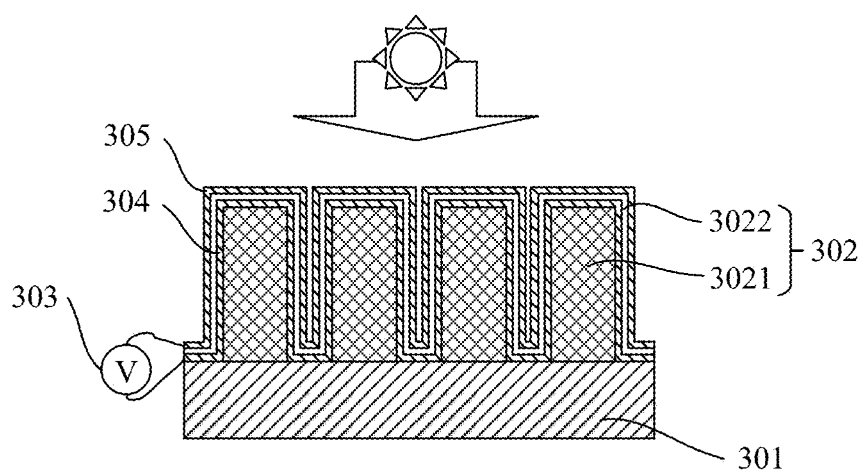
FIG. 5 is a schematic diagram of a structure of another reflective display device according to an embodiment of this disclosure.

FIG. 5 is a schematic diagram of a structure of another reflective display device according to an embodiment of this disclosure. A difference between the structure of the reflective display device in FIG. 5 and the structure of the reflective display device in FIG. 4 lies in that: thicknesses of the second conductive layer 305 are inconsistent. In the reflective display device provided in this disclosure, only a thin layer of conductive material is needed as the second conductive layer 305 to meet a display requirement of the reflective display device. Therefore, both a first conductive layer 304 and the second conductive layer 305 may be a thin layer of conductive material.

The following is an example process in which a control circuit 303 controls an imaginary part of a refractive index of an electrochromic material thin film 3022 to adjust a reflection peak including a dielectric material array 3021 for visible light.

The control circuit 303 outputs a corresponding electrical signal based on a specific display requirement. When an imaginary part of a refractive index of an electrochromic material is zero under control of the electrical signal, that is, an absorption rate of the electrochromic material is zero, light is incident to an antenna array 302 to form reflection of limited bandwidth. This is presented as a high reflection peak at a specific wavelength position. In this case, reflectance of the antenna array 302 is the highest, and is visually presented as a specific color with high luminance. However, when the imaginary part of the refractive index of the electrochromic material gradually increases under control of the electrical signal, the absorption rate of the electrochromic material increases, the reflectance of the antenna array 302 decreases, and the reflection peak at the specific wavelength position gradually decreases. This is visually presented as a specific color with low luminance. After the imaginary part of the refractive index of the electrochromic material is increased to a specific extent under control of the electrical signal, the reflectance of the antenna array 302 is reduced to a minimum, and is visually presented as very low luminance, to form black. Therefore, the imaginary part of the refractive index of the electrochromic material may be adjusted through control of the electrical signal, to adjust luminance of a color presented by reflection of the antenna array 302, and various colors can be displayed based on an additive color principle.

In this embodiment of this disclosure, the electrochromic material may be a transition metal oxide such as tungsten trioxide ($WO_3$) or nickel oxide (NiO), or may be an organic polymer such as polyaniline. This is not limited in this embodiment of this disclosure.

In addition, because the electrochromic material has a bistable characteristic, and a state obtained when an optical loss of the electrochromic material changes can be continuously maintained. Therefore, the electrical signal does not need to be continuously applied when the state of the electrochromic material is maintained. When luminance is adjusted, the electrochromic material does not need to continuously consume energy. This can reduce energy consumption of the entire display device.

In the antenna array 302 of the reflective display device, different antenna widths and different array periods may enable the dielectric material array 3021 to support different optical resonance modes, and reflection of limited bandwidth may be formed at a specific spectral wavelength position.

Figure 6:
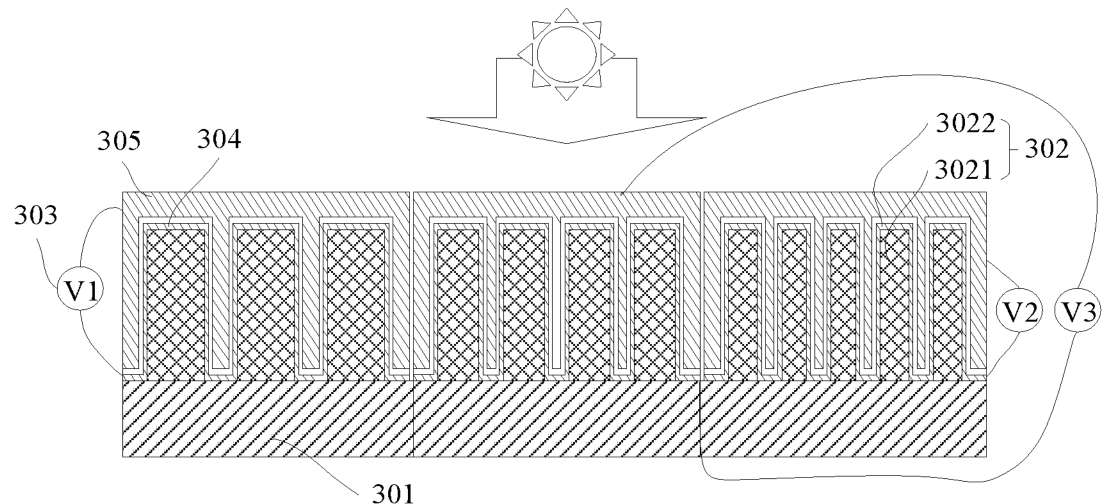
FIG. 6 is a schematic diagram of a structure of a pixel unit including three reflective display devices according to an embodiment of this disclosure.

FIG. 6 is a schematic diagram of a structure of a pixel unit including three reflective display devices according to an embodiment of this disclosure. In FIG. 6, the three reflective display devices with different periods and different antenna widths together form a pixel unit 201, that is, a color pixel unit. The three different reflective display devices may be separately reflected to form different structural colors, for example, may respectively correspond to blue, green, and red.

Figure 7:
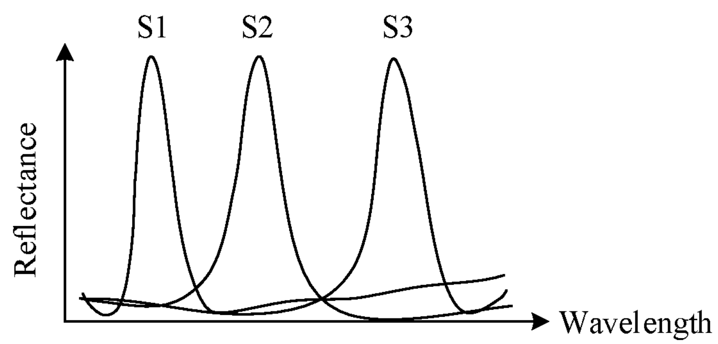
FIG. 7 is a reflection spectrum waveform diagram 1 of a reflective display device according to an embodiment of this disclosure.

The three different reflective display devices are separately controlled by respective independent control circuits 303. FIG. 7 is a reflection spectrum waveform diagram 1 of a reflective display device according to an embodiment of this disclosure. A waveform diagram in FIG. 7 corresponds to a case in which an imaginary part of a refractive index of an electrochromic material thin film 3022 in three different reflective display devices is zero. In FIG. 7, a waveform S1 represents blue, a waveform S2 represents green, and a waveform S3 represents red. It may be learned that, in FIG. 7, reflectance corresponding to each color is high, and the electrochromic material thin film 3022 is presented as a material without an optical loss. In this case, luminance of each color is also highest.

Figure 8:
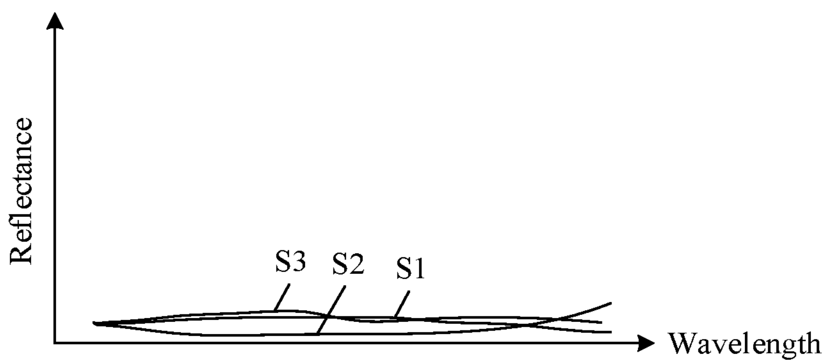
FIG. 8 is a reflection spectrum waveform diagram 2 of a reflective display device according to an embodiment of this disclosure.

In addition, FIG. 8 is a reflection spectrum waveform diagram 2 of a reflective display device according to an embodiment of this disclosure. A waveform diagram in FIG. 8 corresponds to a case in which an imaginary part of a refractive index of an electrochromic material thin film 3022 in three different reflective display devices increases to a specific extent. In FIG. 7, a waveform S1 represents blue, a waveform S2 represents green, and a waveform S3 represents red. It may be learned that, in FIG. 8, reflectance corresponding to each color is very low, and the electrochromic material thin film 3022 is presented as a material with an optical loss. In this case, luminance of each color is the lowest, and is visually presented as black.

Therefore, refer to the schematic diagram in FIGS. 2A-2D, reflective display devices of different colors form a pixel unit 201, that is, a color pixel unit, and color pixel units are periodically arranged to form a color display panel. Through independent control of control circuits 303 in different reflective display devices in each pixel unit 201, luminance of each pixel unit 201 is adjusted, to display a color image.

The following describes a reflective structure device by using an example.

Figure 9:
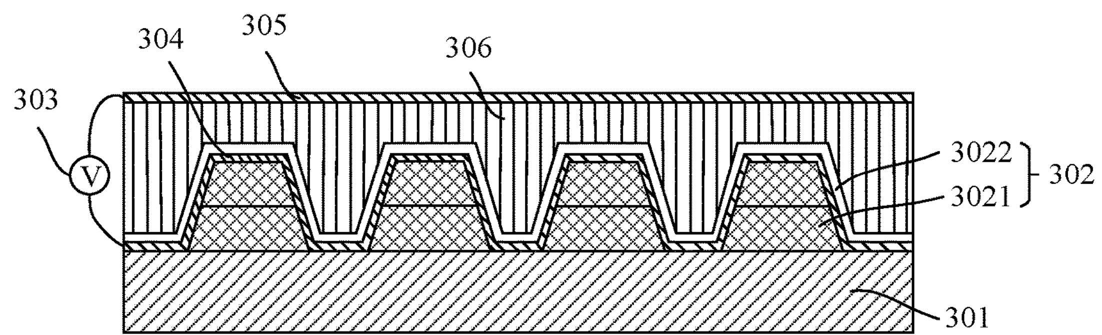
FIG. 9 is a schematic diagram of a structure of an example of a reflective display device according to an embodiment of this disclosure.

FIG. 9 is a schematic diagram of a structure of an example of a reflective display device according to an embodiment of this disclosure. In FIG. 9, the reflective display device includes a substrate 301. The substrate 301 is a glass substrate and mainly plays a support role. A material of the substrate 301 is silicon dioxide, and a refractive index of the silicon dioxide in a visible light section is 1.46. An antenna array 302 is disposed above the substrate 301, a shape of each antenna unit in the antenna array 302 is a trapezoid, and an included angle between a side length and a bottom base of the trapezoid is 70 degrees. Dielectric materials selected for a dielectric material array 3021 in the antenna array 302 are silicon nitride and titanium dioxide, and a refractive index of the silicon nitride is 2, and a refractive index of the titanium dioxide is 2.45. The dielectric material array 3021 is covered with a first conductive layer 304 with a thickness of 10 nanometers as a conductive electrode. A material of the first conductive layer 304 is indium tin oxide, and is transparent, and a refractive index of the indium tin oxide is 1.37. The first conductive layer 304 is further covered with a layer of organic electrochromic material polyaniline (PAM) with a thickness of 30 nanometers as an electrochromic material thin film 3022. The organic electrochromic material is covered with a second conductive layer 305, and the second conductive layer 305 may also be indium tin oxide. In addition, an electrolyte layer 306 is disposed between the electrochromic material thin film 3022 and the second conductive layer 305. A refractive index of the electrolyte layer 306 is 1.33. This further facilitates conducting electricity of the second conductive layer 305. It should be understood that the electrolyte layer 306 herein is optional, and implementation of an actual function is not affected if the electrolyte layer 306 is not disposed.

In the reflective structure device shown in FIG. 9, first, the electrochromic material thin film 3022 in the reflective structure device is controlled by using a control circuit 303 to be in a first state, that is, a real part of the refractive index is 1.37, and an imaginary part of the refractive index is 0. In addition, a height of the antenna array 302 is fastened. By adjusting a width w of the antenna array 302, an array period p of the antenna array 302 may change a spectral wavelength (wavelength) position of a reflection peak formed after visible light is reflected by the antenna array 302. The changed spectral wavelength position may correspond to different structural colors.

Figure 10:
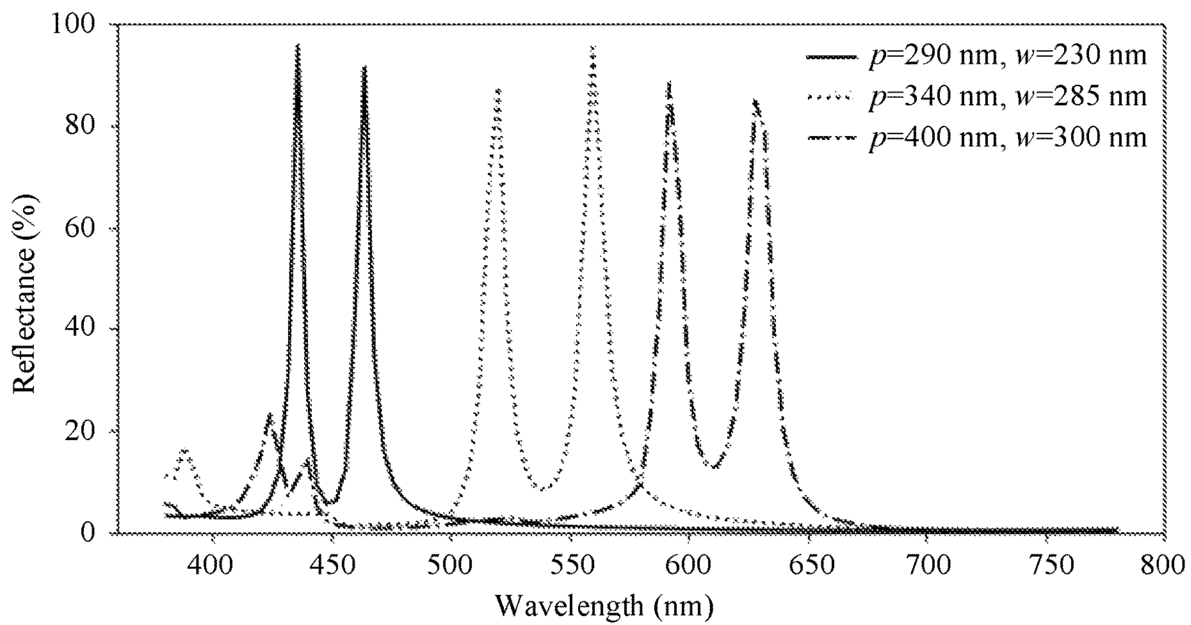
FIG. 10 is a reflection spectrum waveform diagram corresponding to a case in which a refractive index of an electrochromic material is zero in the example shown in FIG. 9.

FIG. 10 is a schematic diagram of reflection spectrums formed by different antenna array structures. Referring to FIG. 10, when an array period p of an antenna array 302 is 290 nanometers, and an antenna width w of the antenna array 302 is 230 nanometers, a reflection peak is formed at a position at which a spectral wavelength is 450 nanometers, and reflectance (reflectance) is greater than 90%. In this case, a structural color is presented as blue. In this case, a reflective display device formed by the antenna array 302 may be used as the third reflective display device in FIG. 2D.

When the array period p of the antenna array 302 is 340 nanometers, and the antenna width w of the antenna array 302 is 285 nanometers, the reflection peak is formed at a position at which a spectral wavelength is 550 nanometers, and the reflectance is greater than 80%. In this case, the structural color is presented as green. In this case, the reflective display device formed by the antenna array 302 may be used as the second reflective display device in FIG. 2D.

When the array period p of the antenna array 302 is 400 nanometers, and the antenna width w of the antenna array 302 is 300 nanometers, the reflection peak is formed at a position at which a spectral wavelength is 600 nanometers, and the reflectance is greater than 80%. In this case, the structural color is presented as red. In this case, the reflective display device formed by the antenna array 302 may be used as the first reflective display device in FIG. 2D.

Figure 11:
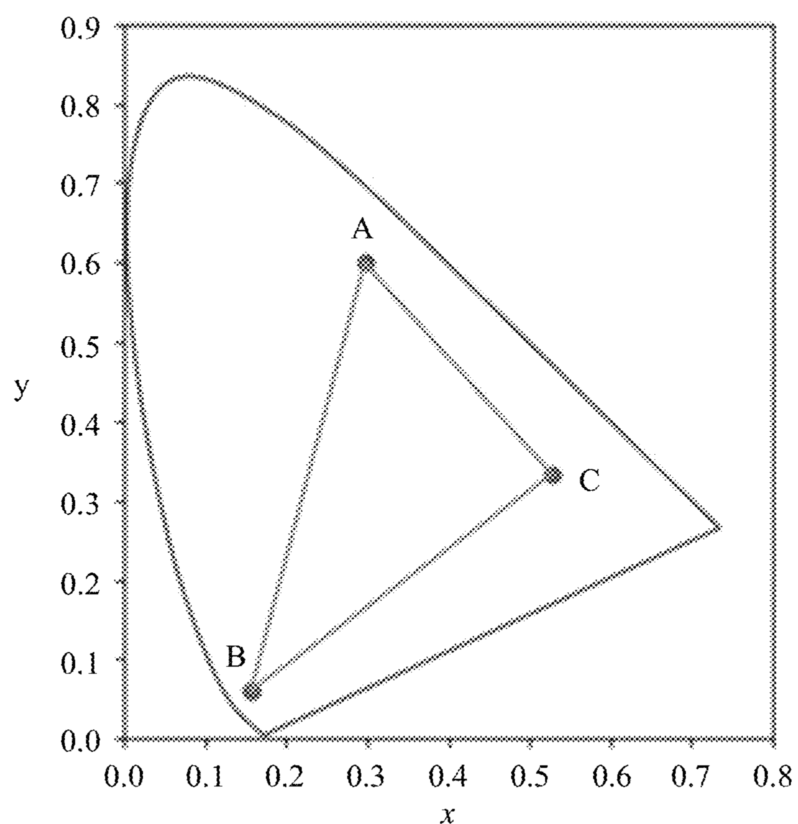
FIG. 11 is a schematic diagram of a position corresponding to a structural color generated in the example shown in FIG. 9 in a CIE 1931 chromaticity diagram.

FIG. 11 is a schematic diagram of coordinates of the structural color presented by the reflection spectrum in FIG. 10 in a CIE 1931 chromaticity diagram. A point A represents green, a point B represents blue, and a point C represents red. The points A, B, and C are connected as a triangle, and the triangle area is a color gamut range that can be covered by the reflective device in FIG. 6. It may be learned that the color gamut range covered by the points A, B, and C is large, and various reflective display application scenarios can be supported.

It should be understood that, in the International Commission on Illumination (CIE) 1931 chromaticity diagram shown in FIG. 11, a horizontal coordinate x is a proportion of a red component in three primary colors (red, green, and blue), and a vertical coordinate y is a proportion of a green component in the three primary colors (red, green, and blue). In the CIE 1931 chromaticity diagram, a sum of proportions of a red component, a green component, and a blue component in each color should be equal to 1.

Figure 12:
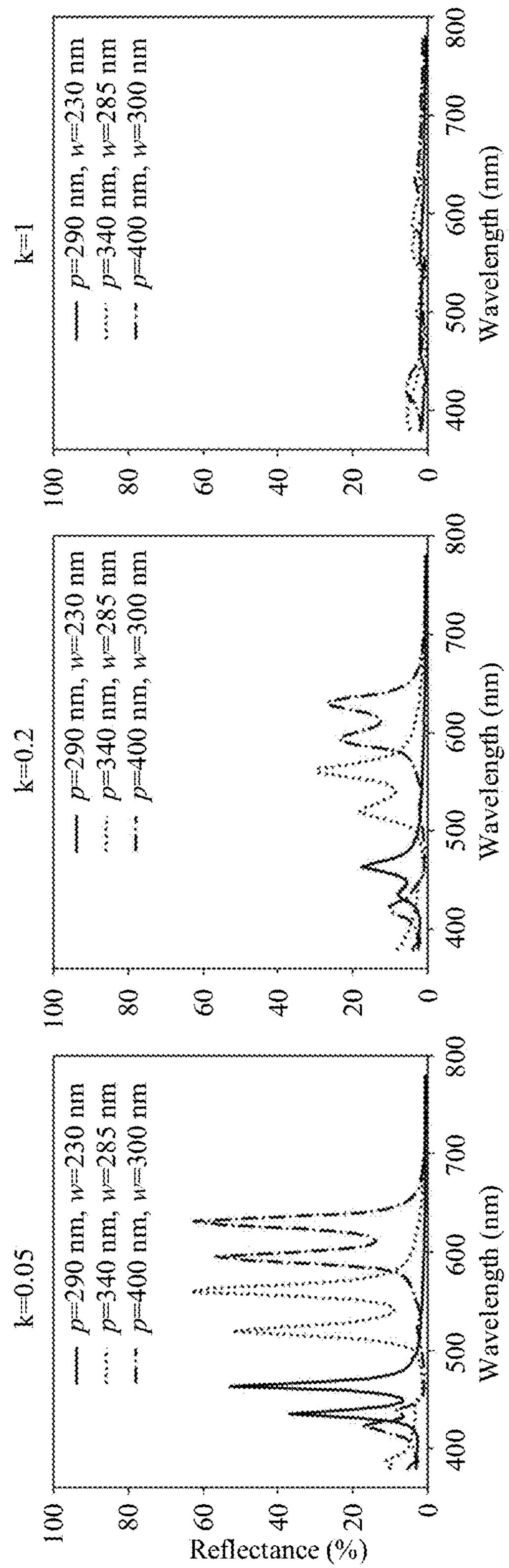
FIG. 12 is a reflection spectrum waveform diagram corresponding to a case in which a refractive index of an electrochromic material increases in the example shown in FIG. 9.

FIG. 12 is a reflection spectrum when an imaginary part k of a refractive index of the electrochromic material thin film 3022 in the three structures in FIG. 9 is equal to 0.05, 0.2, and 1. As shown in FIG. 12, when the imaginary part of the refractive index of the electrochromic material thin film 3022 increases, a height of a reflection peak in a reflection spectrum corresponding to each structural color decreases. When the imaginary part k of the refractive index of the electrochromic material thin film 3022 is equal to 1, the height of the reflection peak in the reflection spectrum corresponding to each structural color is reduced to the lowest. That is, the structure of the antenna array 302 has extremely low emissivity in an entire visible light band. This corresponds to disabling of luminance of the corresponding structural color. Therefore, by adjusting the imaginary part of the refractive index of the electrochromic material thin film 3022, luminance of a structural color formed after visible light is emitted on the antenna array 302 may be adjusted.

For color display, the reflective display devices shown in FIG. 9 may be combined and arranged based on a corresponding antenna width and an antenna array period to form a color pixel unit 201, for example, shown in FIGS. 2C and 2D. Each reflective device includes an independent control circuit 303. Color luminance of light reflected by a corresponding reflective device may be controlled by using the control circuit 303, and reflection display of various different colors is implemented by mixing three or more colors based on an additive color principle.

In addition, if energy consumption of the reflective display device is not considered, and a switching speed of the device is increased, a proportion of an enabled or disabled state of the device in a time dimension may be controlled, and the luminance of the structural color is controlled by using visual persistence effect of human eyes. That is, the reflective display device is set to two states. One is bright-state display of a specific color, and in this case, the luminance of the color is the highest; and the other is dark-state display of a specific color, and in this case, the luminance of the color is the lowest. Luminance of a display color is controlled based on a ratio of bright-state display time to dark-state display time of the specific color. For example, in a time period, if the ratio of the bright-state display time to the dark-state display time of the specific color is 1:1, the luminance of the color that can be visually perceived by human eyes is 50%.

Figure 13:
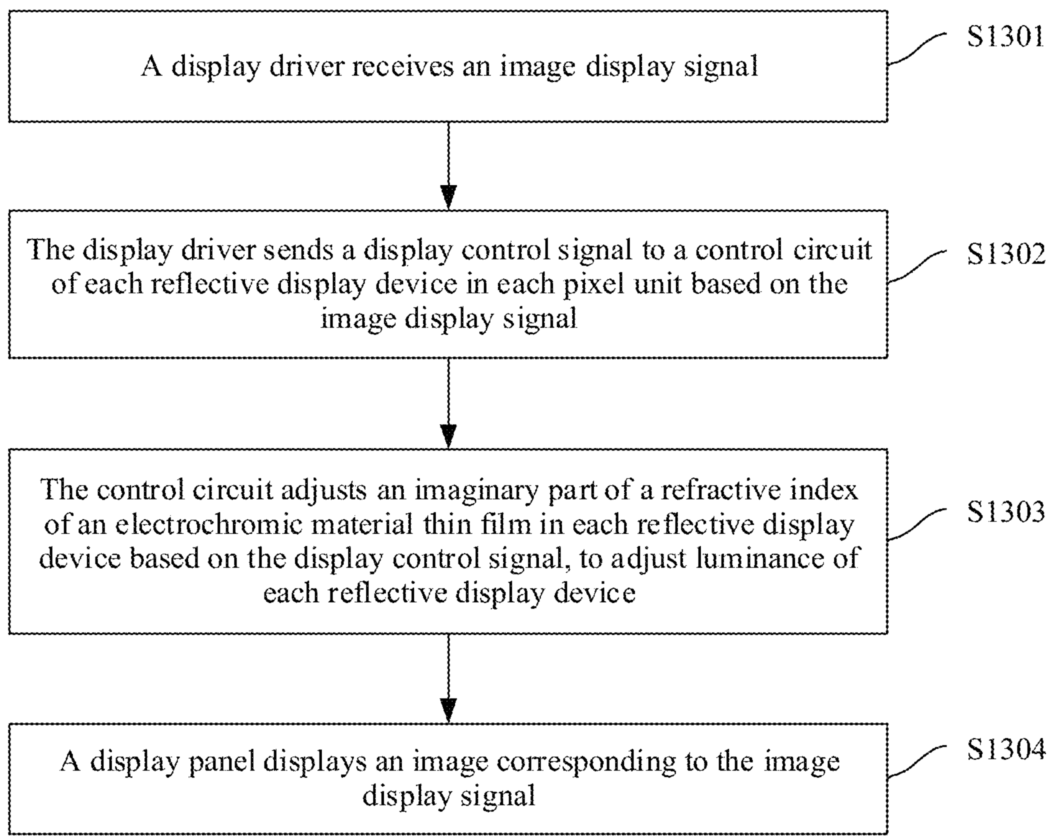
FIG. 13 is a flowchart of an image display control method according to an embodiment of this disclosure.

For image display, an embodiment of this disclosure further provides an image display control method. FIG. 13 is a flowchart of the image display control method according to this embodiment of this disclosure. The image display control method may be applied to the display 01 shown in FIG. 1.

Refer to FIG. 13, the display principle in FIGS. 2A-2D and the reflective display device in FIG. 4 or FIG. 5 is used as an example, and the image display control method includes:

S1301: A display driver receives an image display signal. When an image is displayed, the display driver receives the image display signal. The image display signal includes pixel information of the image that needs to be displayed. In a display panel of the display 01, each reflective display device may control luminance display of a color by using a control circuit 303 based on corresponding pixel information, to implement color display in each pixel unit 201.

S1302: The display driver sends a display control signal to a control circuit 303 of each reflective display device in each pixel unit 201 based on the image display signal. Luminance adjustment of the reflective display device is controlled by the control circuit 303. When the display driver receives the image display signal, the display driver sends a display control signal to the control circuit 303 of each reflective display device in the corresponding pixel unit 201 based on pixel information in the image display signal, and the display control circuit 303 adjusts an imaginary part of a refractive index of an electrochromic material thin film 3022 in the corresponding reflective display device.

S1303: The control circuit 303 adjusts the imaginary part of the refractive index of the electrochromic material thin film 3022 in each reflective display device based on the display control signal, to adjust luminance of each reflective display device. Generally, the imaginary part of the refractive index of the electrochromic material thin film 3022 in the reflective display device is controlled by a voltage. When different voltages are applied to the electrochromic material thin film 3022, the imaginary part of the refractive index of the electrochromic material thin film 3022 is of different sizes, and the electrochromic material thin film 3022 presents different optical losses during optical reflection. Therefore, when the control circuit 303 receives the display control signal, the control circuit 303 outputs a control voltage, to adjust the imaginary part of the refractive index of the electrochromic material thin film 3022 in each display device, and to adjust a reflection peak formed by the dielectric material array for visible light.

S1304: When the control circuit 303 completes a condition of the imaginary part of the refractive index of the electrochromic material thin film 3022 in the display device during emission, the display panel displays the image corresponding to the image display signal.

The foregoing descriptions are merely implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A reflective display device, comprising:

a substrate comprising a first side;

an antenna array disposed on the first side of the substrate, wherein the antenna array comprises:

a dielectric material array periodically arranged on the first side of the substrate and comprising a surface, wherein the dielectric material array is configured to reflect visible light to form a reflection peak; and an electrochromic material thin film covering the surface; and a control circuit comprising a conductive material and connected to the electrochromic material thin film using the conductive material, wherein the control circuit is configured to adjust an imaginary part of a refractive index of the electrochromic material thin film to adjust the reflection peak.

2. The reflective display device of claim 1, wherein the conductive material comprises a first conductive layer disposed between the dielectric material array and the electrochromic material thin film and comprises a second conductive layer disposed on a second side that is of the electrochromic material thin film and that is away from the dielectric material array, and wherein both the first conductive layer and the second conductive layer are connected to the control circuit.

3. The reflective display device of claim 1, wherein the dielectric material array comprises a first material, wherein the substrate comprises a second material, wherein a first refractive index of the first material is greater than a second refractive index of the second material.

4. The reflective display device of claim 3, wherein a real part of the first refractive index is greater than 2.

5. The reflective display device of claim 3, wherein a real part of the second refractive index is less than 2.

6. The reflective display device of claim 1, wherein the first side is made of a transparent material.

7. The reflective display device of claim 6, wherein the transparent material is configured to reflect ambient light.

8. The reflective display device of claim 1, wherein the dielectric material array further comprises one or more of silicon, silicon nitride, gallium nitride, and titanium dioxide.

9. A display, comprising:

a display panel; and a display driver connected to the display panel, wherein the display driver is configured to control the display panel to display an image, wherein the display panel comprises a plurality of pixel units that are periodically arranged, wherein each of the pixel units comprises a plurality of reflective display devices, wherein each of the reflective display devices comprises:

a substrate comprising a first side;

an antenna array disposed on the first side of the substrate, wherein the antenna array comprises:

a dielectric material array periodically arranged on the first side of the substrate and comprising a surface, wherein the dielectric material array is configured to reflect visible light to form a reflection peak; and an electrochromic material thin film covering the surface; and a control circuit comprising a conductive material and connected to the electrochromic material thin film using the conductive material, wherein the control circuit is configured to adjust an imaginary part of a refractive index of the electrochromic material thin film to adjust the reflection peak for the visible light.

10. The display of claim 9, wherein the conductive material comprises a first conductive layer disposed between the dielectric material array and the electrochromic material thin film and comprises a second conductive layer is disposed on a side that is of the electrochromic material thin film and that is away from the dielectric material array, and wherein both the first conductive layer and the second conductive layer are connected to the control circuit.

11. The display of claim 9, wherein the dielectric material array comprises a first material, wherein the substrate comprises a second material, wherein a first refractive index of the first material is greater than a second refractive index of the second material.

12. The display of claim 11, wherein a real part of the first refractive index is greater than 2.

13. The display of claim 11, wherein a real part of the second refractive index is less than 2.

14. The display of claim 9, wherein the first side is made of a transparent material.

15. The display of claim 14, wherein the transparent material is configured to reflect ambient light.

16. The display of claim 9, wherein the dielectric material array further comprises one or more of silicon, silicon nitride, gallium nitride, and titanium dioxide.

17. The display of claim 9, wherein each pixel unit comprises at least three reflective display devices, and wherein antenna widths in the antenna array are different and array periods of the antenna array are different in different reflective display devices.

18. An image display control method, comprising:

providing a display panel with a substrate and an antenna array that comprises a dielectric material array periodically arranged on a first side of the substrate;

receiving, by a display driver of the display panel, an image display signal;

sending, by the display driver, a display control signal to a control circuit of each reflective display device of a plurality of reflective display devices in each pixel unit of a plurality of pixel units of the display panel based on the image display signal;

adjusting, by the control circuit, an imaginary part of a refractive index of an electrochromic material thin film covering surfaces in each of the reflective display devices of each of the pixel units based on the display control signal to adjust a reflection peak formed by the dielectric material array for visible light and to adjust luminance of each of the reflective display devices;

adjusting a luminance of each of the reflective display devices based on the display control signal; and displaying, by the display panel of a display, an image corresponding to the image display signal.

19. The image display control method of claim 18, wherein adjusting the imaginary part of the refractive index of the electrochromic material thin film in each of the reflective display devices comprises outputting, by the control circuit and based on the display control signal, a control voltage to each display device for adjusting the imaginary part of the refractive index of the electrochromic material thin film.

20. The image display control method of claim 18, further comprising controlling, by the display driver, the display panel to display the image.

* * * * *